Figure 1:
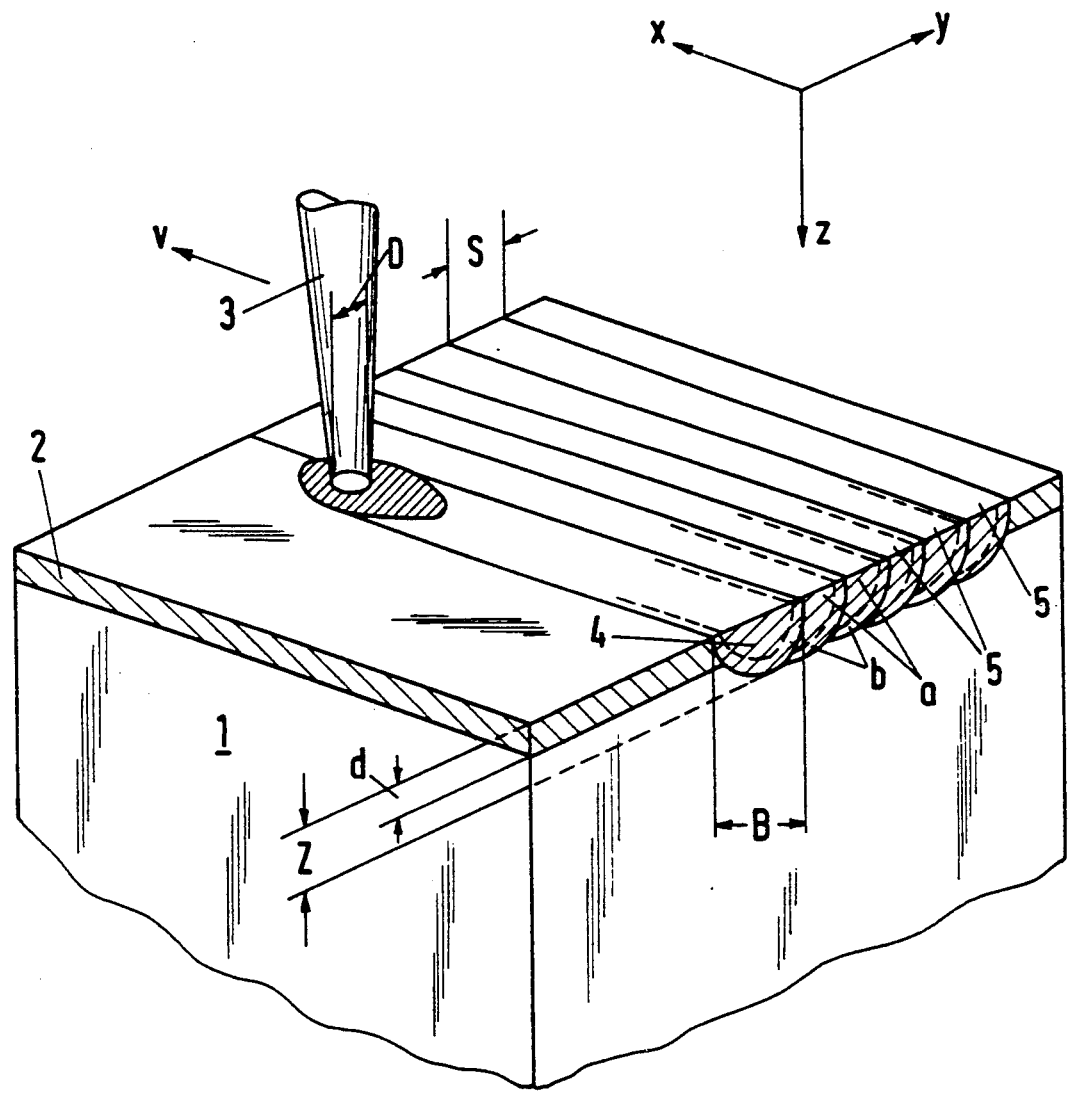

United States Patent [19]

Pierantoni et al.

[11] Patent Number: 5,143,557
[45] Date of Patent: Sep. 1, 1992

[54] SURFACE COATING MADE FROM AN ALUMINUM-BASED ALLOY

[75] Inventors: Michel Pierantoni; Eberhard Blank, both of Lausanne; Michel Carrard, Buchillon; Jean-Daniel Wagniere, Lausanne, all of Switzerland

[73] Assignee: Sulzer Brothers Limited, Winterthur, Switzerland

[21] Appl. No.: 611,321

[22] Filed: Nov. 13, 1990

Related U.S. Application Data

[63] Continuation of Ser. No. 377,883, Jul. 10, 1989, abandoned.

[30] Foreign Application Priority Data

Jul. 19, 1988 [CH] Switzerland ............ 2760/88

[51] Int. Cl.$^5$ ............................................. C21D 10/00
[52] U.S. Cl. ............................ 428/654; 148/903/512
[58] Field of Search .............. 148/4, 1, 152, 903; 428/654

[56] References Cited

U.S. PATENT DOCUMENTS

| | | | |
|---|---|---|---|
| 4,122,240 | 10/1978 | Banas et al. | 148/903 |
| 4,157,923 | 6/1979 | Yen et al. | 148/4 |
| 4,212,900 | 7/1980 | Serlin | 148/152 |
| 4,729,790 | 3/1988 | Skinner | 75/249 |
| 4,747,884 | 5/1988 | Gayle | 148/2 |
| 4,826,736 | 5/1989 | Nakamura et al. | 148/903 |

FOREIGN PATENT DOCUMENTS

| | | |
|---|---|---|
| 0170963 | 2/1986 | European Pat. Off. |
| 0221276 | 5/1987 | European Pat. Off. |
| 0273547 | 7/1988 | European Pat. Off. |
| 55-148752 | 11/1980 | Japan |
| WO8203813 | 11/1982 | World Int. Prop. O. |

OTHER PUBLICATIONS

P. L. Antona, et al, Laser Surface Remelting and Alloying of Aluminum Alloys, Laser Treatment of Materials, D.G.M. Informations—Gesellschaft Verlag, Dec. 1987, pp. 132–145.

Primary Examiner—Scott Kastler
Attorney, Agent, or Firm—Kenyon & Kenyon

[57] ABSTRACT

A substrate based on aluminum (Al) is given a surface coating of aluminum (Al) and silicon (Si) and of at least one element X from the group iron (Fe), nickel (Ni), cobalt (Co), manganese (Mn and chromium (Cr), the total proportion of elements X being 1 to 35 wt.%. Depending on the concentration (C) of elements X in wt.%, the minimum hardness over at least 50% of the coated surface, measured in HV 0.05, can be calculated from the formula;

$$HV\,0.05 = 134 + 2.6 \cdot C + 0.44 \cdot C^2$$

The surface coating with the required minimum hardness greatly improves the mechanical and/or chemical properties of the substrate.

17 Claims, 2 Drawing Sheets

SURFACE COATING MADE FROM AN ALUMINUM-BASED ALLOY

This application is a continuation of application Ser. No. 07/377,883, filed Jul. 10, 1989, now abandoned.

This invention relates to a surface coating made from an aluminum-based alloy. More particularly, this invention relates to an aluminum-based alloy surface coating for a metal substrate containing aluminum.

Heretofore, various types of metallic coatings have been known for the coating of metallic substrates. For example, Japanese Patent 55-148752 describes a coating employing various elements including aluminum for coating a metallic base member. Likewise, European Patent Application 0221276 describes process for applying a composite layer by laser irradiation on an aluminum alloy substrate surface. Still other techniques for producing an amorphous layer on a thin metallic substrate have been known, such as, from European Patent Application 0273,547. In addition, various types of aluminum based alloys have been known, for example, from U.S. Pat. Nos. 4,747,884 and 4,729,790 as well as European Patent Application 0170963.

Aside from these generally known coatings and alloys, it has been known to apply a surface coating formed of an aluminum-based alloy onto a substrate containing aluminum. For example, European Patent 195,604 describes an aluminum-based substrate having a hard surface coating comprising an aluminum (Al)-based alloy for improving the mechanical and/or chemical properties of the surface of the substrate. The Al-based alloy for the surface coating contains at least 50 wt. % Al, 1 to 25 wt. % silicon (Si) and at least one element X from the group consisting of iron (Fe), nickel (Ni), cobalt (Co) and manganese (Mn) in a total concentration of 1 to 35 wt. %. The purpose of the coating is to improve the hardness of the substrate surface at high temperatures, e.g. over 300° C.

A similar surface coating on an Al-based alloy is also described in "Laser Surface Remelting of Aluminum Alloy", an article by P. L. Antona, et al in "Laser Treatment of Materials" edited by B. L. Mordike, DGM Informationsgesellschaft Verlag (1987), page 133.

EP-A-136 508 describes very similar Al-based alloys which have a microeutectic micro-structure similar to the structures of the surface layers described here. The alloys are used in powder metallurgy to produce articles having structures comprising intermetallic deposits in a solid aluminum solution measuring not more than 100 nm in any direction. The powders are obtained by comminution of metal strips obtained by rapid solidification from the metal by the melt-spin process. It is not proposed to use these alloys for coating the surface of Al alloys having a different composition.

The object of the invention is to produce a crack-free substantially smooth surface coating on an aluminum-based substrate, such that the hardness at room temperature and other mechanical and/or chemical properties are much better than those of known surface coatings.

Briefly, the invention provides a surface coating for a metal substrate containing at least 50 weight % aluminum wherein the coating contains at least 50 weight % aluminum, 1 to 25 weight % silicon and at least one element X from the group consisting of iron, nickel, cobalt, manganese and chromium. The coating has a maximum layer thickness of 0.5 millimeters (mm) and, at the least, has hard regions which are rapidly solidified from the molten state, make up at least 50% of the surface and have a micro-hardness whose minimum value in dependence on the concentration of components X is determined by the relation:

$$HV0.05 = 134 + 2.6.C + 0.44.C^2.$$

where C is the total concentration of components X in the surface layer in wt. % from 1 to 35 weight %.

The surface coating is hardened by a method of manufacture in which the surface of the substrate is locally melted by a high-energy beam, the layer being given the required composition by precoating with at least some of the alloy elements, after which the molten surface area is rapidly solidified. The method of manufacture is characterized in that the speed of solidification of the molten surface in the hard region is kept at at least 30 millimeters per second (mm/sec).

The solidification rate depends in complex manner on the geometry of the bath and the rate of advance of the high-energy beam and can be calculated in known manner (see e.g. M. Rappaz, M. Gremaud, R. Dekumbis and W. Kurz: "Solidification Front and Growth Rate during Laser Remelting" in "Laser Treatment of Materials", edited by B. L. Mordike, DGM Informationsgesellschaft Verlag (1987), page 55, equation (1)).

The substrate surface can be given mechanical and chemical properties by optionally adding at least one of the following elements: magnesium, zinc, titanium, vanadium, chromium, zirconium, niobium, molybdenum, cerium, yttrium, carbon and copper, in concentrations up to 15 wt. %. One or more of these elements can be added to increase the hardness and toughness of the hard or less-hard regions and improve the high temperature stability of the surface coating.

More particularly, the hardness can be further improved if the coated substrate is heat-treated in a temperature range between 150° and 300° C. Furthermore, the coated substrate can be heat-treated in the temperature range between 150° and 450° C. or heat-treated and quenched in order to relieve residual stresses.

Depending on the "size of the bath" relative to the starting structure produced during melting by the high-energy beam, it may be advantageous for the substrate surface for coating to be remelted to refine the structure before precoating, in order subsequently to obtain a uniform structure and substantially homogenize chemical composition in the coating surface. In order to reduce the gradients of physical, chemical and mechanical properties between the surface coating and the substrate, the substrate surface can be pre-treated prior to coating with the aforesaid surface coating. For example, surface pre-treatment can consist of remelting or coating with an adaptive layer.

Figure 2:
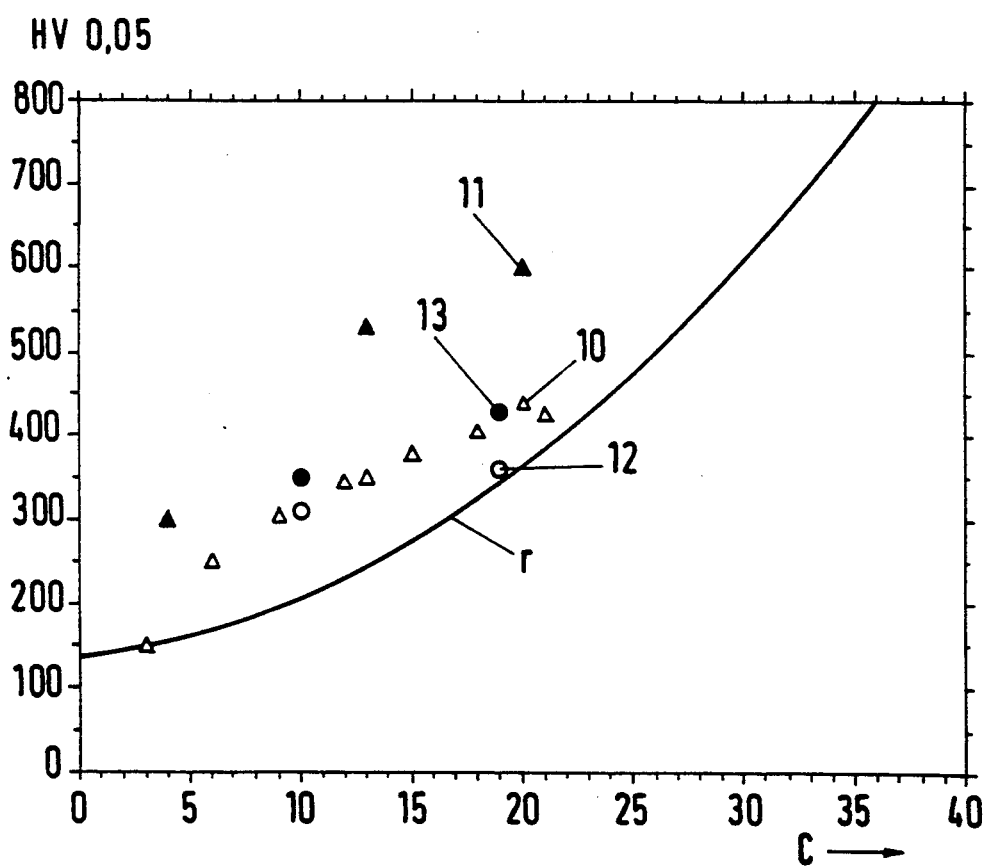

These and other objects and advantages of the invention will become more apparent from the following detailed description taken in conjunction with the accompanying drawings wherein:

FIG. 1 schematically indicates one method of manufacturing a surface coating in accordance with the invention;

FIG. 2 is a graph showing the measured HV 0.05 values in dependence on the concentration C of components X.

Referring to FIG. 1, the metal substrate 1 contains at least 50 weight % of aluminum, for example, being an AlSi casting alloy containing 7 wt. % Si and having an average spacing of about 25 μm between secondary dendrites. A precoating 2, for example, an iron (Fe) layer is applied by electrolytic deposition to the substrate 1. The thickness of the iron layer 2 in the example hereinafter was about 6 μm. The surface of substrate 1 coated with the Fe layer 2 was remelted by a $CO_2$ laser 3 to obtain a hard surface layer 4 of AlSi7Fe20. To this end, the laser beam 3 was moved relative to substrate 1 along a number of tracks 5 in the x direction. The beam had a power of 500 W and was disposed at a height above the treated surface such that the focused beam on the surface had a diameter D of 0.24 mm.

The speed of advance v of the beam 3, which as aforementioned can be used to calculate the solidification rate of the melted or remelted area, was 0.16 m/sec (160 mm/sec). The tracks 5, which are progressively made inthe negative y direction, were offset from one another by a step width S of about half the width B of the molten area under the laser beam 3. By this means, adjacent tracks 5, each of which, as shown in the drawing, produced a trough-shaped "molten" region, resulted in a surface coating having an at least approximately constant depth Z which in the example shown was about 0.08 mm.

As shown in FIG. 1, each track 5 comprised a hard core region a which in the example described was bounded at the edge by a less hard region b. The rate of solidification of the molten surface region, calculated by the initially mentioned method from the rate of advance v (160 mm/sec) of the laser beam 3, was about 80 mm/sec. The solidified surface layer 4 was crack-free and, even without smoothing after-treatment, had a high surface quality with average roughness $R_a \leq 0.5$ μm (DIN 4768/1).

The hardness of the core region a of the individual tracks 5, measured after laser treatment, was 440 HV 0.05 (measurement 10 in the graph in FIG. 2). The hardness was further increased to 600 HV 0.05 (measurement 11 in FIG. 2) by heat treatment of the coated layer 1 for one hour at a temperature of 220° C., after which the substrate 1 was cooled down by standing in stagnant air.

In a second embodiment, a hard surface coating 4 was produced on the same AlSi7 substrate 1. The hardening element X, however, was not 20 wt. % Fe but 19 wt. % Ni, which was first deposited on the substrate surface by electrolysis as before and to approximately the same thickness as the iron in Example 1.

The same laser beam 3 as in Example 1 was used, without any change in its parameters (power, focus and rate of advance v). After laser treatment, the measured hardness of the core region a of the individual tracks 5 was 360 HV 0.05 (point 12 in FIG. 2). These values were increased to 430 HV 0.05 (point 13) after heat treatment at T=190° C. for two hours.

Of course, the manufacture of the hard surface layer is not restricted to a high-energy laser beam; use can also be made of an electron beam, for example. Also, the additional elements for precoating the substrate can be incorporated in the surface either by electrolytic deposition as aforementioned or e.g. by evaporation or thermal sputtering or laser cladding. Pretreatment by galvanic deposition has the additional advantage of giving a smooth surface, which advantageously influences the roughness after remelting by the high-energy beam.

FIG. 2 is a graph showing the measured micro-hardness HV 0.05 of the core regions a of the surface coating in dependence on the concentration C of the layer components X. The concentrations C can be altered from those in Examples 1 and 2, e.g. by varying the thickness of the electrolytically applied preliminary coatings of Fe or Ni. The thickness is varied, e.g. within a range of 1 to 50 μm.

The measured micro-hardness of Fe as the component X is shown by triangle symbols, the "empty" triangles showing the values immediately after laser treatment and the "filled" triangles showing the values after heat treatment as described in Examples 1 and 2.

The hardness for Ni as component X is shown correspondingly by empty and full circles.

The curve r in FIG. 2 shows the variation in HV 0.05 calculated from the formula:

$$HV0.05 = 134 + (2.6C) + (0.44C^2)$$

where C is the total concentration of the elements X in the surface layer 4 in weight % up to 35 weight %.

The maximum limit which may be obtained for the hardness of the new coating is to estimate according to the formula $$HV0.05 = 780 - \exp(-0.2C + 6.45).$$

The term "exp" means "exponential function", i.e., for example, "exp$-x$" = "$e^{-x}$."

What is claimed is:
1. In combination,
   a metal substrate containing at least 50 weight % aluminum; and
   an aluminum-based alloy surface coating on said substrate obtained by moving a high energy beam at a speed of advance sufficient to locally melt a metal coating on said substrate while allowing the molten mass to solidify at a speed of solidification of at least 30 millimeters per second, said surface coating containing at least 50 weight % aluminum, 1 to 25 weigth % silicon and at least one element from a group consisting of iron, nickel, cobalt, manganese and chromium, said coating having a maximum layer thickness of 0.5 millimeters with rapidly solidified hard regions of at least 50% of said coating, said hard regions having a micro-hardness (HV 0.05) with a minimum value in dependence on the concentration (C) in weight % of said at least one element equal to $134 + (2.6C) + (0.44C^2)$.

2. The combination as set forth in claim 1 wherein said coating contains at least one of magnesium, zinc, titanium, vanadium, chromium, zirconium, niobium, molybdenum, cerium, yttrium, copper and carbon.

3. The combination as set forth in claim 2 wherein any of said magnesium and said zinc is present in an amount up to 3 weight %.

4. The combination as set forth in claim 2 wherein any one of said titanium, vanadium, zirconium, niobium, molybdenum, cerium, yttrium, copper and carbon is present in an amount of up to 15 weight %.

5. The combination as set forth in claim 1 wherein said hardness has a maximum value (HV 0.05) equal to 780-exp $(-0.2C + 6.45)$.

6. The combination as set forth in claim 1 wherein said element is iron and said hard regions have a micro-hardness of 440 HV 0.05.

7. The combination as set forth in claim 1 wherein said element is iron and said hard regions have a heat-treated micro-hardness of 600 HV 0.05.

8. The combination as set forth in claim 1 wherein said element is nickel and said hard regions have a micro-hardness of 360 HV 0.05.

9. The combination as set forth in claim 1 wherein said element is nickel and said hard regions have a heat-treated micro-hardness of 430 HV 0.05.

10. A method of producing a surface coating on a metal substrate containing at least 50 weight % aluminum comprising the steps of coating a surface of the substrate with at least one metal element;

moving a high energy beam along the coated surface of the substrate at a predetermined speed of advance to locally melt the metal element coating and said surface to form a molten mass; and rapidly solidifying the molten mass at a speed of solidification of from at least 30 millimeters per second into a surface coating.

11. A method as set forth in claim 10 wherein said speed of solidification is from 50 to 100 millimeters per second.

12. A method as set forth in claim 10 which further comprises the step of heating treating said surface coating.

13. A method as set forth in claim 12 wherein said step of heat treating is performed in a temperature range of from 150° C. to 300° C.

14. A method as set forth in claim 10 which further comprises the step of remelting said substrate surface prior to coating of said surface to refine the structure thereof.

15. A method set forth in claim 10 which further comprises the step of precoating said substrate surface prior to coating of said surface to produce an intermediate layer the strength of which is situated between substrate and coating strength.

16. A method as set forth in claim 10 wherein said high energy beam is moved across the coating at a speed of advance of 160 millimeters per second.

17. A method as set forth in claim 10 wherein said surface coating has a maximum layer thickness of 0.5 millimeters.

* * * * *

UNITED STATES PATENT AND TRADEMARK OFFICE
CERTIFICATE OF CORRECTION

PATENT NO. : 5,143,557
DATED : September 1, 1992
INVENTOR(S) : Pierantoni et al.

It is certified that error appears in the above-indentified patent and that said Letters Patent is hereby corrected as shown below:

ABSTRACT, line 4, change "($M_n$" to --($M_n$)--;

Column 2, line 6, change "HV0.05=134 + 2.6.C + 0.44.$C^2$" to
--HV 0.05=134 +2.6 . C + 0.44 . $C^2$--

Column 3, line 16, change "inthe" to --in the--;

Column 4, lines 15 and 24, change "HV0.05" to --HV 0.05--;

Column 4, line 39, change "weigth" to --weight--.

Signed and Sealed this

Ninth Day of May, 1995

Attest:

BRUCE LEHMAN

Attesting Officer     Commissioner of Patents and Trademarks